United States Patent [19]
Howell et al.

[11] 3,953,766
[45] Apr. 27, 1976

[54] GROUND FAULT CIRCUIT INTERRUPTER AND ELECTRONIC MODULE THEREFOR

[75] Inventors: Edward Keith Howell, Simsbury, Conn.; Donald Leland Watrous, Liverpool; Robert George Hodgins, Canastota, both of N.Y.

[73] Assignee: General Electric Company, New York, N.Y.

[22] Filed: Sept. 16, 1974

[21] Appl. No.: 506,272

[52] U.S. Cl. ............................ 317/18 D; 317/27 R; 317/36 TD
[51] Int. Cl.² .......................................... H02H 3/26
[58] Field of Search ................ 317/9 R, 18 D, 18 R, 317/27 R, 36 TD, 36 R

[56] References Cited
UNITED STATES PATENTS

| | | | |
|---|---|---|---|
| 3,339,114 | 8/1967 | Kelley et al. | 317/36 TD |
| 3,619,723 | 1/1971 | Walden | 317/18 R |
| 3,787,709 | 1/1974 | Coe | 317/18 D |
| 3,800,189 | 3/1974 | Montz | 317/18 D |
| 3,806,764 | 4/1974 | Hobson, Jr. et al. | 317/18 D |
| 3,836,821 | 9/1974 | Wahlgren et al. | 317/18 D |
| 3,849,706 | 11/1974 | Johnson et al. | 317/36 TD |

*Primary Examiner*—J. D. Miller
*Assistant Examiner*—Harry Moose
*Attorney, Agent, or Firm*—Robert A. Cahill; Walter C. Bernkopf; Frank L. Neuhauser

[57] ABSTRACT

An electronic module for ground fault circuit interrupters (GFCI) in both circuit breaker and receptacle configurations includes a signal processor having a plurality of fault signal threshold stages for differentially charging an integrating capacitor in accordance with the magnitude of the fault signal as amplified by a high gain differential amplifier. The accumulated charge on the integrating capacitor controls the generation of a trip signal. The processor also includes a highly stable grounded neutral excitation oscillator and a noise rejection network to combat nuisance tripping.

24 Claims, 3 Drawing Figures

FIG. 2.   SIGNAL PROCESSOR 38

GROUND FAULT CIRCUIT INTERRUPTER AND ELECTRONIC MODULE THEREFOR

BACKGROUND OF THE INVENTION

The need for ground fault cirucit interrupting devices (GFCI) in certain residential electrical circuits and on construction sites to protect people from potentially injurious electrical shock is becoming well recognized as evidenced by their adoption by the National Electrical Code and OSHA. These devices respond to ground fault leakage currents of five milliamps or more to interrupt a circuit in time to prevent injurious consequences. To respond to such low level, but nevertheless hazardous, ground fault currents requires extreme sensitivity which can only be achieved using sophisticated electronic circuitry. Such ultra-sensitivity renders the GFCI device susceptible to nuisance tripping by electrical noise which is inevitably present on residential circuits in surprising abundance. Elaborate measures are necessary to counter this noise problem, in order that the GFCI device trip only with the existence of ground fault leakage current of the requisite magnitude.

In addition, the electric circuitry must be produced as a compact, essentially miniaturized module such that, when combined with circuit interrupting means, the completed device can be accommodated in existing load centers as a GFCI circuit breaker or outlet boxes as a GFCI receptacle, in the same manner as conventional circuit breakers and outlet receptacles. Such circuitry miniaturization aggravates the problems of noise, temperature variations, and instability.

It is accordingly an object of the presnt invention to provide an improved ground fault circuit interrupting (GFCI) device.

Another object of the present invention is to provide a GFCI device of the above character which incorporates an improved, ultrasensitive electronic module.

Still another object is to provide a GFCI electronic module of the above character, wherein nuisance tripping due to noise is avoided.

A further object is to provide a GFCI electronic module of the above character, which is reliable over a long operating life and is relatively inexpensive to manufacture in quantity.

Other objects of the invention will in part be obvious and in part appear hereinafter.

SUMMARY OF THE INVENTION

In accordance with the present invention, there is provided a GFCI device in either a circuit breaker or receptacle configuration which is capable of reliably interrupting a circuit experiencing a ground fault leakage current at or above a prescribed level, e.g., 5 milliamperes. Moreover, the GFCI device has the capability of interrupting the circuit in the event a low impedance ground fault is sensed on the neutral conductor; a condition which does not typically produce ground fault current, but does affect the sensitivity to ground fault current flowing from a co-existing ground fault on the line conductor.

Further in accordance with the present invention, the GFCI device includes an electronic module having a differential current transformer for detecting current imbalances in the line and neutral conductors of the circuit. In event of a current imbalance indicative of the presence of ground fault leakage current, a fault signal voltage is induced in the transformer secondary winding for application to a signal processor included in the module. The signal processor is equipped with a differential amplifier of high voltage gain for amplifying this fault signal, which is then commonly applied to a plurality of threshold comparators. These comparators are selectively activated, depending on the amplified fault signal amplitude, to control the charging of an integrating capacitor at differing rates, likewise dependent on the fault signal amplitude. The charge accumulating on this capacitor in response to a persistent fault signal develops a trip signal effect to trigger an electronic switch, thereby completing an energization circuit for a trip solenoid. An additional threshold comparator is utilized to respond directly to unamplified large fault signals and to voltages on the integrating capacitor just below the trip signal threshold level to charge the integrating capacitor at a still faster rate, thus insuring that the GFCI device will trip forthwith.

The module is powered from the AC circuit in which it is connected and includes either a half-wave or full wave rectified power supply section for developing a highly regulated DC supply voltage to insure reliable and repeatable operation. The power supply section includes provisions for preventing spurious operations of other sections and components of the module as the supply voltage level varies from the prescribed regulated level.

A high frequency oscillator is connected to drive a neutral excitation transformer for the detection of a ground fault on the neutral conductor. This oscillator is in the form of an extremely stable relaxation oscillator utilizing a solid state switch as the active element connected in circuit with a capacitor and the primary winding of the neutral excitation transformer.

The module further includes a noise rejection network for combating the effects of noise which contribute to nuisance tripping. This network operates in response to noise on the regulated voltage supply bus for preventing spurious charging of the integrating capacitor and suppressing any differential amplifier responses due to noise. In addition, means are provided for by-passing and/or attenuating noise entering other points in the module, such that any noise entering the module circuitry appears most pronounced on the regulated voltage supply bus. Operation of the noise rejection network to preclude nuisance tripping is thus assured.

The invention accordingly comprises the features of construction, combinations of elements and arrangements of parts which will be exemplified in the constructions hereinafter set forth, and the scope of the invention will be indicated in the claims.

For a fuller understanding of the nature and objects of the invention, reference should be had to the following detailed description taken in conjunction with the accompanying drawings, in which.

Like reference numerals refer to corresponding parts throughout the several figures of the drawings.

DETAILED DESCRIPTION

Figure 1:
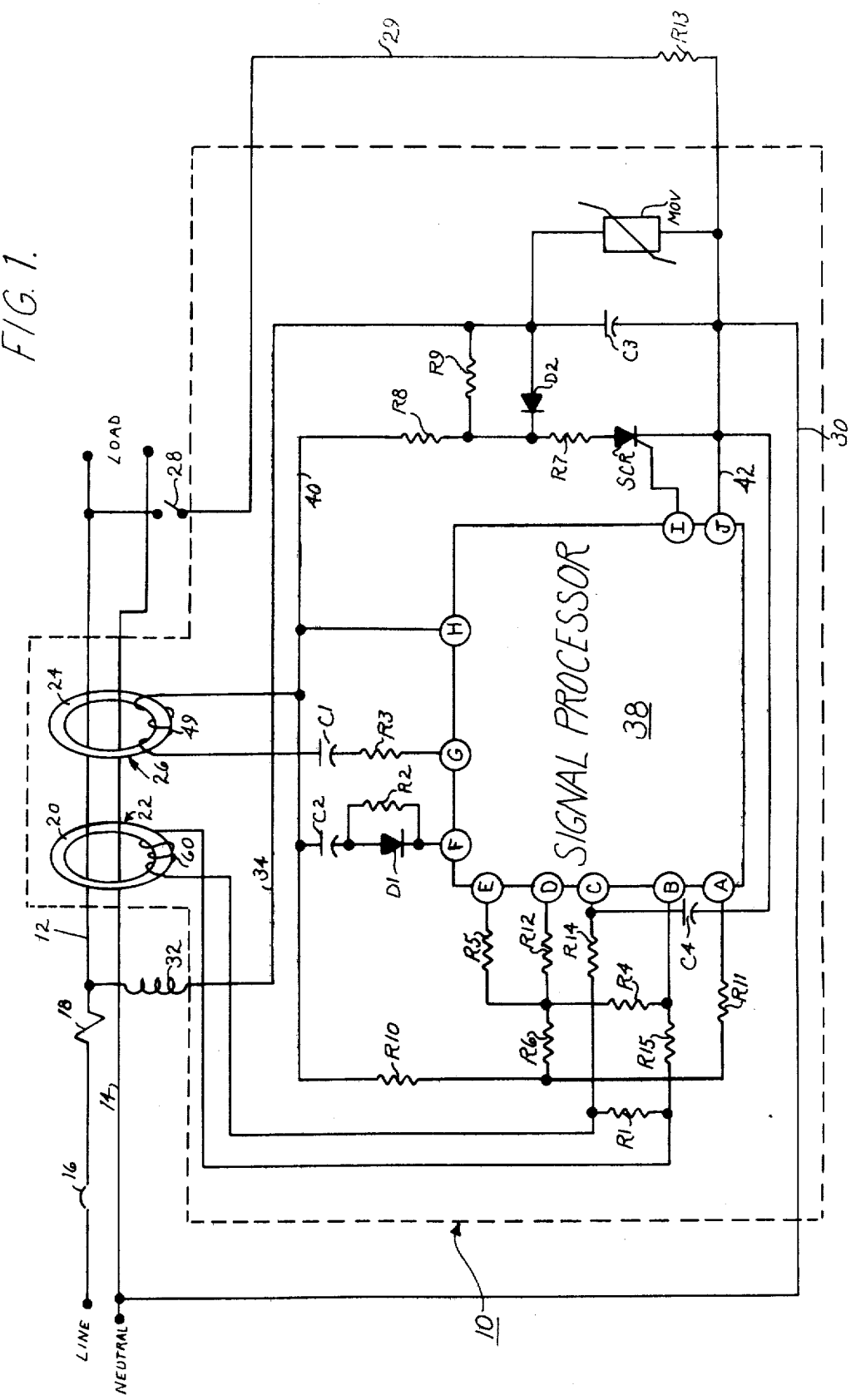
FIG. 1 is a schematic diagram, partially in block form, of a GFCI circuit breaker constructed in accordance with one embodiment of the present invention.

Referring to FIG. 1, the ground fault circuit interruption (GFCI) module of the invention, generally indicated at 10, is adapted to sense ground fault currents in a typical residential electrical power distribution circuit consisting of a line conductor 12 and a neutral conductor 14. Included in the line side of the circuit are circuit breaker contacts 16 and conventional thermalmagnetic trip elements, diagrammatically indicated at 18, all in accordance with conventional GFCI circuit breaker design. The line conductor 12 passes through a toroidal core 20 of a differential current transformer, generally indicated at 22, and also through the toroidal core 24 of a grounded neutral excitation transformer, generally indicated at 26. Neutral conductor 14 is likewise passed through toroidal cores 20 and 24 for connection, with the line conductor, to a power consuming load (not shown). In conventional fashion, line conductor 12 is connected at the load side of the transformers 22 and 26 through a push-to-test switch 28, lead 29, resistor R13, and lead 30 to the neutral conductor 14 on the line side of the transformers. Upon closure of switch 28, current of a predetermined magnitude somewhat in excess of the established trip current level flows through resistor R13 to the neutral conductor, bypassing the differential current transformer 22 in the same manner as would ground fault current. If the GFCI circuit breaker is functioning properly, a trip solenoid 32, connected over lead 34 in series with module 10 across the line and neutral conductors is energized to trip the circuit breaker and open the breaker contacts 16.

Considering now the circuit details of module 10, it is seen that trip solenoid 32 is connected by lead 34, a half-wave rectifying diode D2, a resistor R7 and a silicon controlled rectifier switch SCR and lead 30 across the line and neutral conductors at the line side of the differential current transformer 22. Upon sensation of a ground fault current (or a simulated ground fault current achieved by closure of switch 28) by differential current transformer 22, a signal processor 38 in the module 10 functions to trigger the silicon controlled rectifier switch SCR, causing energization of the trip solenoid and tripping of the circuit breaker.

Power for module 10 is also developed through trip solenoid 32, however, the current drawn in powering the module is well below the level necessary to actuate the solenoid. With switch SCR in its open circuit condition, supply current flows from solenoid 32 through diode D20 and resistor R8 to develop a positive halfwave rectified voltage on bus 40. Diode D20 is shunted by a relatively large resistor R9 to accommodate reverse current flow during negative half cycles. A low-pass filter capacitor C3 is connected from the anode of diode D20 to a circuit ground bus 42, which is connected by lead 30 to the neutral conductor. A metal oxide varistor MOV is also connected from the anode of diode D2 to ground bus 42 for high voltage transient suppression.

Figure 2:
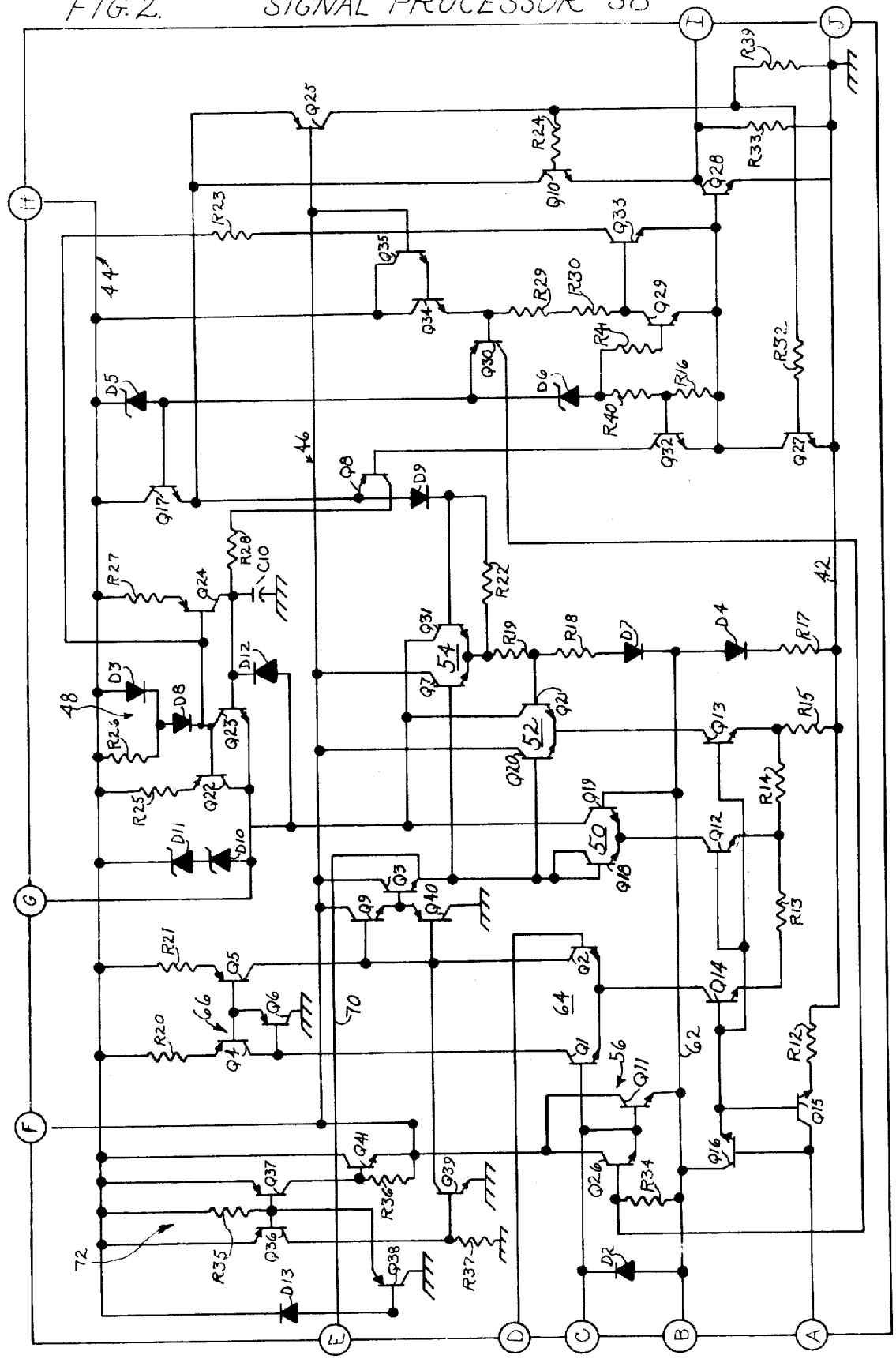
FIG. 2 is a detailed circuit schematic diagram of the signal processor of FIG. 1.

Referring to FIGS 1 and 2, bus 40 is connected via terminal H to a bus 44 in the signal processor 38 on which is developed a regulated supply voltage of, for example, 18 volts in the following manner. As the voltage on bus 40 starts positive, current is drawn through an integrating capacitor C2, diode D1, terminal F of the signal processor (FIG. 2), a signal bus 46, the base emitter junctions of transistors Q34 and Q35 connected in Darlington emitter follower fashion, resistors R29 and R30, and the base-emitter junctions of transistors Q33 and Q28 to ground bus 42. Current flow into the base of transistor Q33 biases this transistor into conduction which, as will be seen, serves to disable an oscillator, generally indicated at 48, connected to drive a primary winding 49 of neutral transformer 26. Furthermore, base current into transistor Q28 biases this transistor on to effectively short the gate and cathode of switch SCR, respectively connected to terminals I and J of signal processor 38 (FIG. 1) and thereby inhibit triggering during this time while the buses 40 and 44 are being brought up to regulated voltage.

As the voltage on bus 44 (FIG. 2) rises to approximately one-half of the regulated voltage level, e.g., 9 volts, zener diode D5 conducts, and the resulting current flow therethrough provides base current for transistor Q17. With this transistor biased into conduction, current flows from bus 44 through its collector-emitter circuit, diode D9, resistors R22, R19 and R18, diodes D7 and D4, and resistor R17 to ground bus 42. As will be seen, current flow through this voltage divider chain is effective to activate a series of four threshold level comparators, generally indicated at 50, 52, 54 and 56, controlling the charge accumulating on integrating capacitor C2 (FIG. 1) as the result of the sensation of ground leakage current by differential current transformer 22. When the voltage on bus 44 rises to the regulated level, zener diode D6 conducts to supply base current through resistor R40 to turn on transistor Q32, base current through resistor R41 to turn on transistor Q29 and base current through resistor R16 for transistor Q28 to insure its continued conductance and disablement of switch SCR.

The conduction of transistor Q29 shunts base current from transistor Q33, turning it off and thereby removing the base drive on transistor Q24 in oscillator 48 to enable oscillation to begin. With both zener diodes D5 and D6 in conduction, the voltage on buses 40 and 44 is clamped to the regulated voltage level of 18 volts, with the voltage at the junction therebetween regulated to a level of substantially 10 volts. As will be seen, when the voltage on signal bus 46 falls below approximately 9 volts, transistor Q25 is turned on to supply base current through resistor R24 to turn on transistor Q10 and also base current through resistor R32 to turn on transistor Q27. It is seen that the conduction of transistor Q27 shorts base current from transistor Q28, thus turning this transistor off to enable current flowing through transistor Q10 to develop a voltage across resistor R33 and a gate current sufficient to trigger the switch SCR. (FIG. 1). With the switch in its high conduction state, sufficient current is drawn through trip solenoid 32 to activate it and trip the circuit breaker.

Oscillator 48 in the signal processor is connected at terminal G to drive primary winding 49 of transformer 26 (FIG. 1) so as to inject a high frequency signal voltage on the neutral conductor to produce a sensible current in the differential current transformer 22 should the neutral conductor be inadvertently grounded adjacent the load. This known technique is utilized to prevent desensitization of the GFCI circuit breaker resulting from the grounding of the neutral conductor adjacent the load. Since the neutral conductor is also grounded at the source, this double grounding thereof completes the secondary circuit for transformer 26, causing the oscillator signal to produce a current in the neutral conductor in sufficient magnitude to unbalance the differential current transformer 22. This unbalance in the currents passing through the line and neutral conductors in opposite directions creates a residual flux in the core 20 which induces a voltage in a secondary winding 60 wound thereon. As will be seen, a voltage signal of sufficient magnitude induced on secondary winding 60 is processed by the signal processor 38 to trigger the switch SCR and the trip the circuit breaker.

Returning to FIG. 2, the primary active elements in oscillator 48 are transistors Q23 and Q24 connected as a regenerative NPN-PNP pair. These transistors function together as a switch and are the transistor equivalent of an SCR or an SCS (silicon controlled switch). This switch functions with capacitor C1 (FIG 1) to provide a relaxation oscillator which is exceptionally stable regardless of the character of the impedance reflected back into the primary winding 49 of transformer 26. As previously noted, oscillator 48 is disabled in a conducting mode so long as transistor Q33 is conductive to produce current in the base of transistor Q24. Moreover, oscillator 48 cannot begin oscillating until transistor Q8 is turned on which occurs only when the bus 44 reaches regulated voltage level. These restraints placed on oscillator 48 prevent parasitic and spurious oscillations thereof, which could otherwise occur as its supply voltage is rising toward the regulated voltage level.

With transistor Q8 conducting, the base of transistor 23 is tied through resistor R28 to the reference voltage appearing at the emitter of transistor Q18, which is one diode voltage drop down from the reference voltage at the anode of zener diode D5, i.e., essentially 10 volts. Prior to the turning on of transistor Q8, specifically when zener diode D5 conducts to render transistor Q17 conductive upon bus 44 reaching 9 volts, base current is supplied through transistor Q17 to transistors Q19, Q21 and Q31 of the threshold comparators 50, 52 and 54. It will be noted that the collectors of these transistors are tied together to provide parallel current paths for the charging of capacitor C1 from the regulated voltage bus 40 through primary winding 49 and resistor R3 (FIG 1). As seen in FIG. 2, these parallel charging paths are completed as follows: from the emitter of transistor Q19 through the collector-emitter circuit of transistor Q12, resistor R14 and resistor R15 to ground bus; emitter of transistor Q21 through the collector-emitter circuit of transistor Q13 and resistor R15 to the ground bus; and from the emitter of transistor Q31 through resistor R19, resistor R18, diodes D7 and D4, and resistor R17 to the ground bus. When capacitor C1 has charged sufficiently to lower the voltage at the emitter of transistor Q23 to a voltage level one diode voltage drop lower than the voltage on its base applied via the conduction of transistor Q8, transistor Q23 turns on. This transistor begins drawing collector current from bus 44 through the base of transistor Q24, turning it on to draw more base current for transistor Q23 from bus 44 through resistor R27. This additional base current in transistor Q23 draws more base current for trannsistor Q24, which in turn draws more base current for transistor Q23, whereby both transistors turn on in regenerative fashion.

With this switch, consisting of transistors Q23 and Q24, regeneratively latched on, capacitor C1 begins discharging through the primary winding 49, bus 40, bus 44 and the oscillator circuit 48 back to capacitor C1 through resistor R3. Some of this discharge current flows through the emitter-collector circuit of transistor Q24 into the base of transistor Q23, maintaining the latter on. Discharge current also flows through the parallel combination of resistor R26 and diode D3, diode D8 and the collector-emitter circuit of transistor Q23. This discharge path supplies base current to transistor Q24, maintaining it on, and base current to turn transistor Q22 on. Still another discharge current path through the oscillator circuit 48 is resistor R25 and the emitter-collector circuit of transistor Q22. These plural discharge current paths through the oscillator circuit 48 afford complete stability with variations in temperature and discharge current amplitudes. Some of this discharge current at the emitter of transistor Q23 is drawn through transistors Q19, Q21 and Q31 to maintain threshold comparator current. As this discharge current falls off in magnitude, less collector current through transistor Q24 is available to transistor Q23, which begins to turn off. Similarly, less discharge current at the cathode of diode D8 is available as base current for transistor Q24, reducing the conductance of this transistor, which further reduces the base current into transistor Q23. This regenerative process abruptly drives both transistor Q23 and Q24 into nonconduction.

Due to the inductance of primary winding 49 and any reflected inductance therein, a "ringing" condition is established with capacitor C1. As the voltage on the lower side of capacitor C1 (emitter of transistor Q23) swings more positive than the regulated voltage on bus 44, zener diodes D10 and D11 conduct to protect the oscillator components from reverse voltages. These zener diodes also protect the oscillator circuit from high voltages induced in the primary winding 49 of transformer 26 during the flow of short circuit fault currents in the distribution circuit, which may reach magnitudes as high as 5,000 amps. The use of two zener diodes in series is resorted to in order to sustain voltage levels at the emitter of transistor Q23 of lower magnitudes than the 10-volt reference level established at the anode of zener diode D5. Diode D12 connected between the emitter and base of transistor Q3 prevents this transistor from experiencing a reverse avalanche breakdown of the base-emitter junction. Capacitor C10 connected from the collector of transistor Q24 to ground affords suppression of very high frequency parasitic oscillations.

Current signals developed in differential current transformer secondary winding 60, as the result of a current imbalance in the line and neutral conductors occasioned by a ground fault, develop signal voltages across a burden resistor R1 seen in FIG. 1. The lower end of this burden resistor is connected through resistor R15 and terminal B of signal processor 38 (FIG. 2) to a signal reference bus 62 referenced to the ground bus 42 through diode D4 and resistor R17 of the comparator reference voltage divider chain. The upper terminal of burden resistor R1 is connected through resistor R14 and signal processor terminal C to the base of transistor Q1 connected with transistor Q2 as a differential amplifier 64. Diode D2 is connected between the base of transistor Q1 and the signal reference bus 62 to serve as a clamp for excessive signal currents occasioned by the flow of high magnitude fault currents in the distribution circuit. As seen in FIG. 2, the emitters of transistors Q1 and Q2 are tied together and connected through the collector-emitter circuit of transistor Q14 and resistors R13, R14 and R15 to the ground bus 42. The collector of transistor Q1 is connected through the emitter-collector circuit of transistor Q4 and resistor R20 to the regulated voltage bus 44, while the collector of transistor Q2 is connected through the emitter-collector circuit of transistor Q5 and resistor R21 to the regulated voltage bus. The bases of transistors Q4, Q5 are tied together and connected through the emitter-collector circuit of transistor Q6 to ground. The base of transistor Q6 is connected to the collector of transistor Q4, whereby these three transistors function as a so-called "current mirror" 66.

The base of transistor Q2 of the differential amplifier is connected via signal processor terminal D through an impedance matching resistor R12 to the junction between resistors R6 and R4 (FIG. 1). The other end of resistor R6 is connected through resistor R10 to the regulated voltage bus 40, while the other end of resistor R4 is connected via terminal B to the signal reference bus 62. These resistors serve to develop offset bias on the differential amplifier. The current mirror 66 supplies essentially equal collector currents to transistors Q1 and Q2 of the differential amplifier 64, with the result that the differential amplifier is afforded extremely high voltage gain. The amplifier output is taken from the collector of transistor Q2 through a Darlington emitter-follower, consisting of transistors Q9 and Q3, to an amplifier output bus 70. Amplifier output bus 70 is brought out to terminal E for negative feedback connection via resistors R5 and R4 to terminal B and signal reference bus 62 so as to set the voltage gain of the differential amplifier to a suitable value, for example, 100.

The amplifier output at the emitter of transistor Q3 is supplied in parallel to the bases of transistors Q18, Q20 and Q7 of the first, second and third threshold comparators, respectively. It will be recalled that transistors Q19, Q21 and Q31 of the threshold comparators in effect constitute parallel charging current sources for oscillator capacitor C1. In similar fashion, transistors 18, 20 and 7 of the threshold comparators constitute parallel current sources for the charging of integrating capacitor C2. Thus, it is seen that the collectors of each of these transistors are connected in common to the signal bus 46, which, in turn, is connected via signal processor terminal F to the integrating capacitor C2 through diode D1.

Bus 40 is connected through resistor R10, resistor R11 and signal processor terminal A to the collector of transistor Q15. The emitter of this transistor is connected through resistor R12 to ground bus 42. The collector-base junction of transistor Q15 is shunted by the base-emitter junction of a transistor Q16, the collector of which is connected to the signal reference bus 62. The junction of the emitter of transistor Q16 and the base of transistor Q15 is connected in common with the bases of transistors Q14, Q12 and Q13. From this circuit arrangement, it is seen that transistors Q15 and Q16 cooperate with transistors Q14, Q12 and Q13 to provide a series of current mirrors for regulating current through the differential amplifier 64, the first threshold comparator 50 and the second threshold comparator 52. In a practical embodiment of the present invention, circuit parameters were selected such that the current through the differential amplifier was regulated at 20 microamperes and the current through the first threshold comparator at 35 microamperes and the current through the second threshold comparator at 350 microamperes. While the third threshold comparator 54 is not equipped with a current mirror, the base of its transistor Q31 is referenced to the regulated voltage bus 44 through the collector-emitter circuit of transistor Q17 and diode D9, and its emitter voltage is established by the drop across resistor R22 such that the current through this threshold comparator is established at 1.6 milliamps.

Assuming a low level ground fault current sensed by the differential current transformer 22, the differential amplifier will develop an output sufficient to turn on transistor Q18 of the first threshold comparator. Current from the power supply for charging the oscillator capacitor C1 through transistor Q19 is transferred to the other side of the first threshold comparator and flows through transistor Q18 and transistor Q3 to charge capacitor C2. During the negative half cycles of the power supply, a portion of the charge on capacitor C2 is drained off through resistor R2 in shunt with diode D1 and the effective collector-substrate diode junctions of transistors Q9, Q3, Q26, Q20, Q7 when the processor is reproduced in integrating circuitry. For higher ground fault current, the differential amplifier output is effective to turn on transistor Q20 in the second threshold comparator 52, and charging current for capacitor C1 flowing through transistor Q21 is transferred to transistor Q20 for charging the integrating capacitor C2 at a faster rate. Similarly, for still higher ground fault currents, the differential amplifier output turns on transistor Q7 to divert charging current for capacitor C1 through transistor Q31 to transistor Q7 for charging current for capacitor C1 through transistor Q31 to transistor Q7 for charging the integrating capacitor C2 at a still faster rate. At this point, if the third threshold comparator becomes involved in the charging of the integrating capacitor C2, insufficient current is available from the power supply to charge the oscillator capacitor C1 and oscillator 48 ceases to oscillate, thereby making available sufficient current from the power supply to rapidly charge the integrating capacitor C2.

As charge is accumulated on integrating capacitor C2 during the positive half cycles of the regulated supply voltage on bus 44, the voltage on signal bus 46 begins falling from the regulated voltage level of 18 volts. This reduces the output voltage of the Darlington emitter-follower consisting of transistors Q34 and Q35, such that the base of transistor Q30 is no longer tied to the regulated 18 volt level on bus 44. As the signal bus voltage drops below a first threshold level, 10.5 volts, the transistor Q30 is biased on through the resistors R29 and R30. With transistor Q30 on, the 10 volt reference voltage at its emitter supplies current directly to the base of transistor Q26 connected in Darlington fashion with transistor Q11. Transistor Q26 thus turns on transistor Q11 to provide still another charge current path for integrating capacitor C2. Since resistor R17 is the only resistance limiting the charging current through transistor Q11, this level of charging current is of a higher magnitude than the charging current through the third threshold comparator 54. Consequently, the integrating capacitor C2 is charged at a still faster rate and independent of the ground fault current level.

When the voltage of signal bus 46 falls below a second threshold level, 9 volts, it is seen that transistor Q25 is turned on, which then turns on transistors Q10 and Q27; the latter serving to turn transistor Q28 off and thus remove the triggering restraint on the switch SCR. Transistor Q10 passes current which develops a voltage across resistor R33 and produces gate current sufficient to trigger the switch SCR and energize the trip solenoid to trip the circuit breaker. If triggering of the SCR occurs late in the positive half cycle of line voltage, the solenoid will not receive sufficient energy to trip the circuit breaker at that time. During the next succeeding negative half-cycle integrating capacitor C2 discharges partially through resistor R2. The extent of this discharge is less than the difference between the first and second threshold levels, such that the voltage of signal bus 46 is still below the first threshold level at the beginning of the next positive half cycle. Thus, threshold comparator 56 is conditioned to conduct charging current for capacitor C2 at the beginning of this next positive half-cycle, and triggering of switch SCR to trip the circuit breaker during this next positive half-cycle is assured.

It will be noted that transistor Q11 can be turned on directly from the secondary output of the differential current transformer 22 when the line conductor is experiencing a low impedance ground fault resulting in the flow of ground leakage currents in the ampere range rather than the milliampere range. In this event, it is necessary to trip the circuit breaker forthwith. To this end, with transistor Q11 biased into conduction directly by the signal voltage developed across the burden resistor R1, the integrating capacitor C2 is rapidly charged to quickly develop the requisite signal voltage level on bus 46 for biasing transistor Q25 into conduction pursuant to firing the switch SCR.

An important feature of the present invention resides in the inclusion of a noise rejection network, generally indicated at 72 in FIG. 2, for rendering the signal processor 38 insensitive to noise injected into the circuit, in order that nuisance tripping be avoided. It will be appreciated that nuisance tripping is an extremely serious problem with GFCI circuit breakers which must be avoided. If the GFCI circuit breaker habitually trips because of noise, the user will replace the GFCI circuit breaker with a conventional circuit breaker, thus shunning high impedance ground fault protection for the sake of continued electrical service.

It is found that the noise present on residential power circuits can have extremely high frequencies well into the VHF spectrum and can originate from any number of sources. Home appliances are found to be particularly noisy. The interference seen on one's television screen when certain appliances, motors, or switches are in operation is evidence of very high frequency electrical noise on the power lines which can cause nuisance tripping of GFCI circuit breakers unless provisions are made in the signal processor 38 to reject this noise.

As seen in the drawing, noise rejection network 60 includes a pair of transistors Q36 and Q37, whose bases are connected in common and to regulated voltage bus 44 through resistor R35. Their bases are also connected in common to the emitter of a transistor Q38, whose collector is grounded and base is connected back to bus 44 through diode D13. The emitters of transistors Q36 and Q37 are connected in common directly to bus 44. The collector of transistor Q36 is grounded through resistor R37. The voltage across this resistor is applied to the base of a transistor Q39 whose emitter is grounded and whose collector is connected to drive a transistor Q40 included in the Darlington emitter-follower (transistors Q3 and Q9) in the output of differential amplifier 64. The collector of transistor Q37 is connected to drive the base of a transistor Q41, whose collector is connected to the regulated voltage bus 44 and emitter is connected to the signal bus 46. The base and emitter of this transistor are interconnected by a resistor R36.

One of the major effects of high frequency noise injected on the regulated voltage bus 48 is the alternate charging and discharging of the internal base-to-collector capacitance of transistor Q6 of the current mirror included in the differential amplifier circuit. This is particularly so when signal processor 38 is reproduced in integrated circuit form. The charging and discharging of this internal capacitance by noise on bus 48 causes unequal currents to flow in the two sides of the current mirror, and the differential amplifier responds as though a fault signal were present by producing an output at the emitter Q3 of the Darlington emitter-follower. This output can turn on one or more of the comparator circuits 50, 52 and 54, thus providing current sources for the charging of integrating capacitor C2. As previously described, the charging of integrating capacitor C2 lowers the voltage on signal bus 46, ultimately to a level where the SCR is triggered and the GFCI circuit breaker trips. To combat this, the noise rejection circuit 60 utilizes the internal base-to-collector capacitance of transistor Q6. Thus, with the presence of noise on bus 48, transistor Q38 goes into conduction to complete the base drive circuit for transistors Q36 and Q37. The conduction of transistor Q37 drives transistor Q41 into conduction, thus connecting, through its collector-emitter circuit, the regulated voltage bus 48 to the signal bus 46. It is thus seen that, in the event any of the comparators 50, 54 and 56 are turned on by the response of the differential amplifier to noise, current is drawn from the regulated voltage bus 44 to the signal bus 46 through transistor Q41 rather than from bus 40 through the integrating capacitor C2 (FIG. 1). In other words, the signal bus is in effect clamped to the supply bus by the conduction of transistor Q41, thus preventing the charging of integrating capacitor C2 which would depress the voltage on the signal bus 46 ultimately to the tripping level.

Since the frequency response of emitter-follower transistor Q3 is different from the response of common emitter transistor Q41, additional noise rejection is obtained by transistor Q36 in the noise rejection circuit 72. This transistor also goes into conduction in response to noise on bus 44 to drive transistor Q39 and thence transistor Q40 into conduction. The conduction of transistor Q40 disables the Darlington emitter-follower output of the differential amplifier such as to preclude the turning on of the comparator circuits by the differential amplifier's response to noise. The suppression of these comparator circuits as potential current sources for the charging of integrating capacitor C2 preserves the quiescent voltage level on signal bus 46 during the presence of noise, and nuisance tripping is thus precluded. Since typical noise on the power lines is of a high frequency and normally of an intermittent character, the signal processor has ample time between noise bursts and even during negative half cycles of the noise, when the base-to-collector capacitance of transistor Q38 is discharging and the charging restraints on capacitor C2 are removed, to respond to a fault signal of line frequency.

Since the operation of the noise rejection circuit 72 is triggered by the presence of noise on the regulated voltage bus 44, it is necessary to insure that noise, which may be injected into the circuit from a variety of points, appear most pronounced on bus 44, regardless of the point in the circuit where it is originally injected. To this end, one side of the input to the differential amplifier from the differential current transformer secondary winding 60 is connected to ground through a capacitor C4 in order to bypass a substantial portion of any high frequency noise attempting to enter the circuit by this route. The other side of this input circuit from secondary winding 60 is effectively bypassed to ground by the internal collector to substrate capacitance of transistor Q16 and the anode to ground capacitances of diodes D2 and D4 when the circuit of the drawing is reproduced in integrated circuit form. Moreover, resistors R14 and R15 in the input circuit to the differential amplifier from transformer secondary wind 60 serve to attenuate any high frequency noise such that the effect of noise on the differential amplifier not bypassed to ground is less pronounced than the effect of the same noise superimposed on the regulated voltage appearing on bus 44. It will be appreciated that noise on the power lines which enters the circuit through the differential current transformer secondary input will also be coupled into the circuit then ultimately on to the regulated voltage bus 44 via the power supply section of the module.

Figure 3:
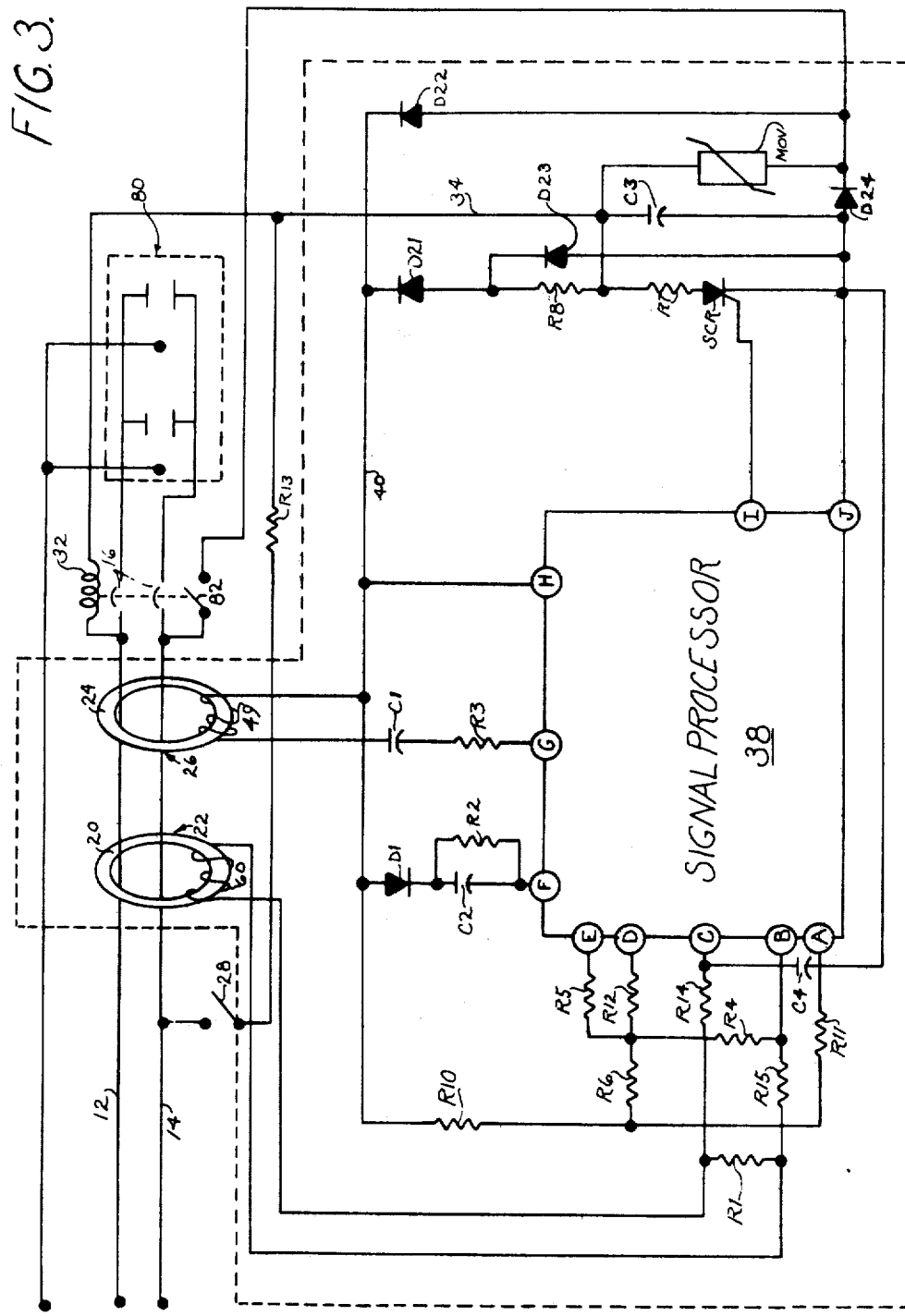
FIG. 3 is a schematic diagram, partially in block form, of a GFCI receptacle constructed in accordance with another embodiment of the present invention, and using the signal processor of FIG. 2.

The module 10 of the present invention is readily adapted with minor modifications, to utilization in a GFCI receptacle configuration. Thus, as seen in FIG. 3, the line and neutral conductors are routed through the core apertures of a differential current transformer 22 and a neutral excitation transformer 26 to a duplex plug receptacle, generally indicated at 80. A ground conductor 82 runs to the ground stabs of the receptacle 80, as is accepted practice. The major differences between the GFCI circuit breaker of FIG. 1 and the GFCI receptacle of FIG. 3 are occasioned by the fact that the latter may be inadvertently wired with the line and neutral connections reversed. Load center designs are such that reversing the line and neutral connections of a GFCI circuit breaker is virtually impossible. To cope with this eventuality in the case of the GFCI receptacle, interrupter contacts 16 are included in both sides of the circuit to insure that the "hot" or line side of the circuit is interrupted in the event of a ground fault, regardless of which way the GFCI receptacle is wired.

Moreover, to insure that the module 10 is properly powered regardless of which way the GFCI receptacle is wired, the input stage to the module power supply section includes, as seen in FIG. 3, full-wave rectification in the form of diodes D21, D22, D23 and D24. With full wave rectification, there are no negative half-cycles during which some of the charge can bleed off of integrating capacitor C2 if connected with diode D1 and resistor R2 in the manner shown in FIG. 1. Consequently, in the receptacle configuration of FIG. 3, the integrating capacitor C2 is connected in parallel with a larger resistor R2 through which some of the capacitor charge can bleed off.

Other distinctions between the circuit breaker and receptacle configurations come about because in the former, the trip solenoid 32 and module 10 are shown being powered from the load side of the interrupter contacts 16, whereas in the latter, the trip solenoid and module are powered from the line side of the interrupter contacts. Since the trip solenoid, due to its miniaturization, is not typically rated for continuous current, its energization circuit must be broken immediately after it has precipitated circuit interruption. In the circuit breaker configuration, this is accomplished by the circuit breaker contacts. Since the trip solenoid 32 is connected to the line side of the interrupter contacts in the receptacle configuration of FIG. 3, additional means are necessary to prevent destruction of the trip solenoid. To this end, an additionsl set of contacts 82, operating in conjunction with the interrupter contacts, selectively make and break the trip solenoid-module energization circuit between the line and neutral conductors. As seen in FIG. 3, contacts 82, ganged to the interrupter contacts so as to make prior to the interrupter contacts and break after the interrupter contacts break, are connected between the conductor 14 (line or neutral) and the cathode of switch SCR through diode D24, which is common to signal processor ground bus terminal J. The other side of this energization circuit is completed from the module through lead 34 and the trip solenoid 32 to conductor 12 (neutral or line). It is thus seen that contacts 82 close to power up the module prior to closure of interrupter contacts 16. In the event of a ground fault, switch SCR is triggered to draw actuating current through the trip solenoid 32. After the interrupter contacts 16 break, the contacts 82 break to terminate the flow of actuating current through the trip solenoid, which by then has completed its function.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. A ground fault circuit interrupting device for interrupting an AC power distribution circuit including line and neutral conductors in response to a ground fault on either conductor; said device comprising, in combination:
  A. contacts for interrupting at least one side of the distribution circuit;
  B. a solenoid energizable from the distribution circuit to initiate circuit interruption by said contacts;
  C. a normally non-conductive switch connected in the solenoid energization circuit, said switch having a control input;
  D. a differential current transformer responsive to a current imbalance in the line and neutral conductors signifying a ground fault for developing a fault signal of a magnitude proportional to the fault current; and
  E. a signal processor for processing said fault signal, said processor including:
    1. an amplifier for amplifying said fault signal,
    2. a trip signal bus,
    3. an integrating capacitor connected to said trip signal bus,
    4. a plurality of threshold circuits connected in parallel to said trip signal bus and individually responsive to the amplified fault signal developed by said amplifier for establishing respectively increasing charging rates for said integrating capacitor depending on the amplified fault signal amplitude, and 5. means connected to said trip signal bus and responsive to the voltage thereon developed by the charge accumulating on said integrating capacitor for generating a trigger signal input to render said switch conductive when said trip signal bus voltage reaches a predetermined level,
   a. whereby to actuate said solenoid and initiate circuit interruption by said contacts.

2. The device defined in claim 1, wherein said signal processor further includes a power supply section connected to receive AC power from the distribution circuit and including means for developing a rectified, regulated DC voltage on a supply bus.

3. The device defined in claim 2, which further includes an excitation transformer coupled with the neutral conductor of the distribution circuit, and said signal processor further includes a relaxation oscillator connected to drive a primary winding of said excitation transformer, the active component of said oscillator being a controllable solid state switch.

4. The device defined in claim 3, wherein said signal processor further includes means for disabling said oscillator until said power supply section has established a rectified DC supply voltage on said supply bus at prescribed regulated level.

5. The device defined in claim 4, wherein said oscillator includes a capacitor connected through a primary winding of said excitation transformer to said supply bus, and said plural threshold circuits connected to control the charging of both said integrating capacitor and said oscillator capacitor.

6. The device defined in claim 2, wherein said switch is a silicon controlled rectifier having a gate electrode as said control input and an anode-cathode circuit connected in series with said solenoid across said line and neutral conductors, and said signal processor includes means for shorting said gate electrode to the cathode of said silicon controlled rectifier in the absence of said trigger signal.

7. The device defined in claim 1, wherein said signal processor includes an additional threshold circuit having a first input connected to receive said fault signal directly from said differential transformer and a second input coupled to said trip signal bus, said additional threshold circuit connected to control charging of said integrating capacitor at a more rapid rate than accommodated by said plural threshold circuits in response to a high magnitude fault signal appearing at said first input and in response to a voltage on said trip signal bus within a predetermined limited range of said predetermined level.

8. The device defined in claim 1, wherein said amplifier is a high voltage gain differential amplifier including a pair of transistors with a current mirror connecting the collectors thereof to said supply bus, said current mirror insuring essentially equal collector currents for said transistors 9. The device defined in claim 8, wherein a second current mirror connected to said supply bus is incorporated in at least one of said plural threshold circuits and in the common emitter circuit of saim amplifier transistor pair for regulating the current flows therethrough.

10. A signal processor for use in a ground fault circuit interrupting device adapted to interrupt an AC power distribution circuit including line and neutral conductors in response to a ground fault on either conductor; said processor comprising, in combination:

A. an amplifier for amplifying a fault signal developed in response to a detected imbalance in the currents flowing in the line and neutral conductors as the result of a ground fault, said fault signal having a magnitude proportional to the fault current;
B. a trip signal bus;
C. an integrating capacitor connected to said trip signal bus;
D. a plurality of threshold circuits connected in parallel to said trip signal bus and individually responsive to the amplified fault signal developed by said amplifier for establishing respectively more rapid charging rates for said integrating capacitor depending on the amplified fault signal magnitude;
E. means connected to said trip signal bus and responsive to the voltage thereon developed by the charge accumulating on said integrating capacitor for generating a trip signal to precipitate circuit interruption of the ground fault circuit interrupting device when said trip signal bus voltage reaches a predetermined level; and
F. an additional threshold circuit having a first input connected to receive the fault signal and a second input coupled to said trip signal bus, said additional threshold circuit connected to control charging of said integrating capacitor at a more rapid rate than accommodated by said plural threshold circuit in response to a high magnitude fault signal appearing at said first input and in response to a voltage on said trip signal bus within a predetermined limited range of said predetermined level.

11. The processor defined in claim 10, which further includes a power supply section for energization from the power distribution circuit and including means for developing a rectified, regulated DC voltage on a supply bus, and said integrating capacitor connected between said supply bus and said trip signal bus.

12. The processor defined in claim 11, which further includes a noise rejection circuit operating in response to electrical noise appearing on said supply bus for inhibiting charging of said integrating capacitor.

13. The processor defined in claim 12, wherein said noise rejection circuit includes means operating in response to electrical noise appearing on said supply bus for connecting said supply bus to said trip signal bus to thereby preclude charging of said integrating capacitor in response to said electrical noise.

14. The signal processor defined in claim 12, wherein said noise rejection circuit includes means operating in response to electrical noise on said supply bus for disabling the output of said amplifier.

15. The signal processor defined in claim 12, wherein said noise rejection circuit further includes bypass capacitance means for shunting high frequency electrical noise from the input of said amplifier, and attenuating means connected in the input to said amplifier for attenuating electrical noise introduced thereat.

16. The signal processor defined in claim 12, wherein said power supply section includes means for activating said plural threshold circuits as the voltage on said supply bus rises to an intermediate voltage level enroute to a regulated voltage level.

17. The signal processor defined in claim 12, wherein said amplifier is a differential amplifier including a pair of transistors, and a current mirror connected between said supply bus and the collectors of said transistor pair for establishing essentially equal collector currents, thus to provide high voltage gain.

18. The signal processor defined in claim 12, which further includes an oscillator connected to said supply bus and driving the primary winding of a neutral excitation transformer in the ground fault circuit interrupting device to create a current imbalance upon the existence of a ground fault on the neutral conductor, said oscillator including a controllable solid state switch as the active element.

19. The signal processor defined in claim 18, wherein said power supply section includes means for maintaining said oscillator disabled until the voltage on said supply bus reaches a predetermined regulated voltage level.

20. An electronic module for use in a ground fault circuit interrupting device having contacts separable in response to energization of a trip solenoid to interrupt an AC power distribution circuit including line and neutral conductors in the event of a ground fault on either conductor, said module comprising, in combination;
  A. a normally non-conductive switch for connection in the energizing circuit for the trip solenoid, said switch having a control input;
  B. a differential current transformer for developing a fault signal in response to a current imbalance in the line and neutral conductors signifying a ground fault, said fault signal having a magnitude proportional to the fault current;
  C. a power supply section for connection to the distribution circuit to develop a rectified DC voltage at a regulated level on a supply bus;
  D. an amplifier for amplifying said fault signal;
  E. a trip signal bus;
  F. an integrating capacitor connected between said supply bus and said trip signal bus;
  G. first means responsive to the output of said amplifier for controlling the charging of said capacitor at a rate indicative of the magnitude of said fault signal, thereby to develop a trip signal voltage on said trip signal bus;
  H. means connected to said trip signal bus and operable when said trip signal voltage reaches a predetermined level to issue a triggering signal to said control input, thereby rendering said switch conductive to enable energization of the trip solenoid; and
  I. nuisance trip prevention means including switching means connected in shunt with said switch control input and controlled by said trip signal voltage on said trip signal bus to shunt triggering signals from said control input so long as said trip signal voltage remains below said pre-determined level.

21. The electronic module defined in claim 20, wherein said nuisance trip prevention means further includes means for maintaining said first means deactivated until said supply bus voltage rises to an intermediate level enroute to said regulated level.

22. The electronic module defined in claim 20, wherein said nuisanse trip prevention means further includes means responsive to the presence of high frequency noise on said supply bus for inhibiting charging of said integrating capacitor.

23. The electronic module defined in claim 22, wherein said nuisance trip prevention means further includes capacitance means shunting high frequency noise from the input of said amplifier and attenuating means in said amplifier input for attenuating high frequency noise received from said differential transformer.

24. The electronic module defined in claim 20, which further includes:
  A. an excitation transformer for coupling with the neutral conductor; and
  B. a high frequency oscillator connected to drive said excitation transformer such as to develop a current imbalance in the line and neutral conductors in the event of a ground fault of the neutral conductor, and
  C. said nuisance trip prevention means further includes means for disabling said oscillator until the voltage on said supply bus rises to said regulated level.

* * * * *